US005303777A

United States Patent [19]
Zook

[11] Patent Number: 5,303,777
[45] Date of Patent: Apr. 19, 1994

[54] ECONOMICAL PADDED HORSESHOE AND METHOD

[76] Inventor: Ben B. Zook, R.D. #2, Box 84, Elverson, Pa. 19520

[21] Appl. No.: 896,249

[22] Filed: Jun. 10, 1992

[51] Int. Cl.⁵ .................................. A01L 3/00; A01L 7/02
[52] U.S. Cl. ........................................ 168/12; 168/28
[58] Field of Search ................ 168/12, 14, 28, DIG. 1

[56] References Cited

U.S. PATENT DOCUMENTS

| | | | |
|---|---|---|---|
| 846,082 | 3/1907 | Bellmann | 168/12 |
| 1,156,278 | 10/1915 | Dove | 168/28 |
| 1,391,655 | 9/1921 | Sinfield et al. | |
| 1,478,874 | 12/1923 | Law | 168/28 |
| 1,496,414 | 6/1924 | Heymoss, Jr. | |
| 1,673,650 | 6/1928 | Tweed | 168/28 X |
| 1,702,882 | 2/1929 | Tweed | 168/12 |
| 2,705,536 | 4/1955 | Phreaner | 168/14 |
| 3,285,346 | 11/1966 | Jenny et al. | 168/DIG. 1 X |
| 3,747,684 | 7/1973 | Wallen | 168/28 |
| 4,235,292 | 11/1980 | Dallmer | 168/4 |
| 4,513,825 | 4/1985 | Murphy | 168/12 |
| 4,565,250 | 1/1986 | Vasko | 168/12 |
| 4,775,011 | 10/1988 | McCuan | 168/12 |
| 4,972,909 | 11/1990 | Rose | 168/4 |

Primary Examiner—Robert P. Swiatek
Attorney, Agent, or Firm—Michael F. Petock

[57] ABSTRACT

A horseshoe utilizes reinforced belting material as padding. In certain embodiments, the reinforced belting material is cut to a certain depth in selected locations and the belting material may be removed along the layers of reinforcing material. A truncated toe portion of a horseshoe is adhesively bonded to the turf side of the toe portion of the pad. The reinforcing material provides lateral stability to the padding allowing a thicker pad with the same stability. A new use is provided for used or seconds belting material for the economical production of improved horseshoes. The padding may also be molded from rubber or plastic with a turf side of the toe portion recessed to accommodate the truncated horseshoe.

20 Claims, 4 Drawing Sheets

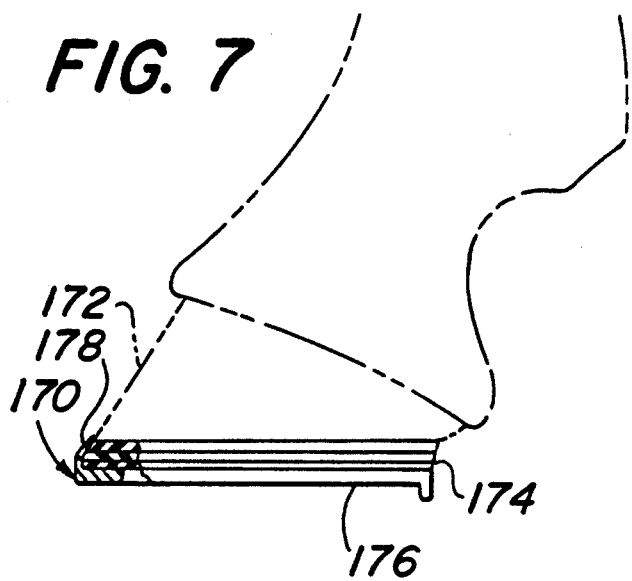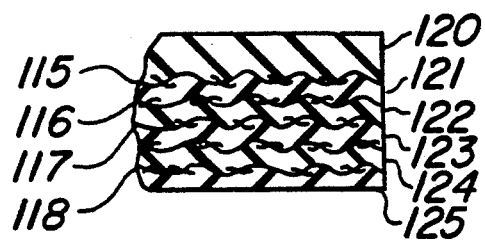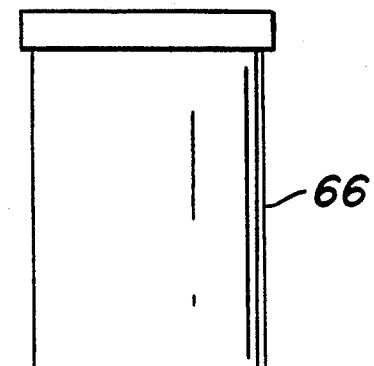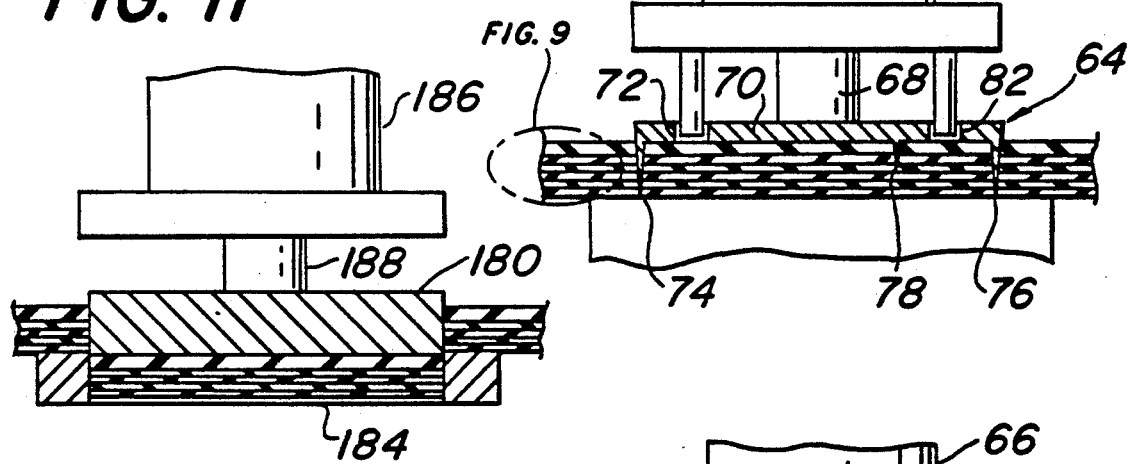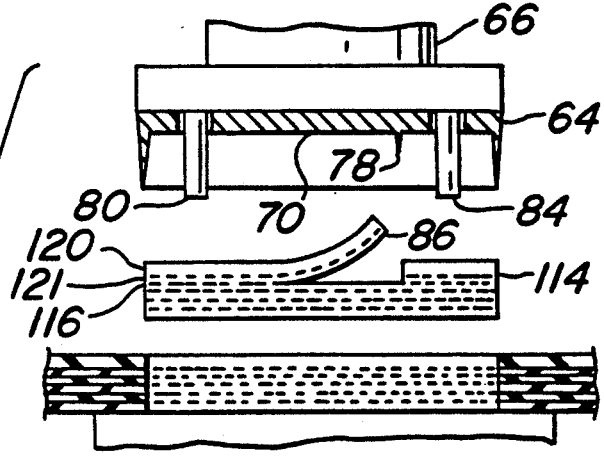

1

ECONOMICAL PADDED HORSESHOE AND METHOD

BACKGROUND OF THE INVENTION

The present invention relates to an improved, economical padded horseshoe and the method of making the same.

Today, many horses are utilized on paved surfaces. Horse's trotting on paved surfaces presents a detrement to the horse's skeletal system due to the shock of the horse's hoof hitting the hard surface and presents a problem of road and street damage, particularly to asphalt pavements, due to the steel horseshoes. The steel horseshoes cause significant pavement erosion at a much faster rate than that encountered by rubber tires of vehicles rolling over the road. This pavement erosion presents significant additional expense to municipalities and local governments which are faced with regular repaving operations.

The present invention solves both of these problems in an economical manner.

SUMMARY OF THE INVENTION

Briefly and in accordance with the present invention, a horseshoe is provided which is comprised of a reinforced belting material having at least one layer of reinforcing fabric material in the plane of the belting. In one embodiment, a toe portion of the turf side of the belting material is removed and a truncated metal horseshoe is adhesively mounted on the belting material on the turf side of the belting where the toe portion has been removed.

In another embodiment of the present invention, the fabric reinforced belting material is provided with a toe calk adhesively mounted in the turf side within a recess in the belting.

In still another embodiment of the present invention, the fabric layer reinforced belting material is provided with a horseshoe adhesively mounted to the turf side of the belting.

In the preferred embodiments of the present invention, the rubber padding material is comprised of fabric reinforced rubber belting. The reinforcing fabric provides substantial lateral stability to the padding. Additionally, where layer portions of the padding are to be removed substantially uniformly, the reinforcing fabric provides a separation line for such removal. Significant economies are achievable by the use of used belting or slightly defective belting referred to as "seconds", thereby providing an economical supply of the padding utilized in the practice of the invention. However, the present invention is not limited to the use of used belting or "seconds" belting, but may be practiced with new belting.

Further, in accordance with the present invention, several unique dies have been invented which substantially aid in the practicing of the present invention. These include various shapes of dies wherein the die has a periphery substantially the shape of the hoof of a horse. The periphery is provided with a cutting edge with a height that will cut completely through the belting. Additionally, a cutting edge recessed from the peripheral cutting edge is provided which extends from one side to the other side of the die at a location intermediate the toe and heel area. The recessed cutting edge may be parallel to the heel portion or may have various shapes extending forward centrally. The invention further comprises a new use for belting material of using it as padding for the shodding of horses.

The present invention further contemplates the use of various molded rubber and/or resilient synthetic materials, including plastics, for use in certain of the embodiments. Various types of molded rubber and/or resilient synthetic pads may be utilized in practicing the embodiments of the invention illustrated in FIGS. 1, 2, 4 and 5.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 7 is an elevation view, partially in cross-section, of another embodiment of an improved horseshoe in accordance with the present invention.

FIG. 8 is an elevation view, partially in cross-section, of a pad being die cut for use in the embodiment of FIG. 1.

FIG. 9 is a broken away cross-sectional view of a portion of the pad shown in FIG. 8.

FIG. 10 is a side elevation view, partially in cross-section, of the die cutting operation and separation step in the preparation of a pad for the embodiment of FIG. 1.

FIG. 11 is a side elevation view, partially in cross-section, illustrating a die cutting operation of a pad for the embodiments of either FIGS. 4 or 7.

DETAILED DESCRIPTION OF THE PREFERRED EMBODIMENTS

Figure 1:
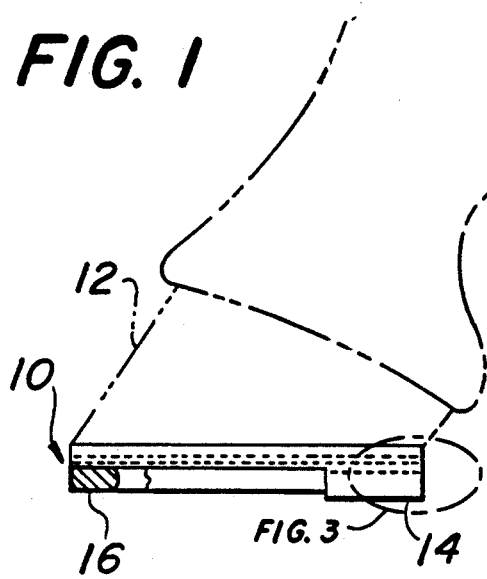
FIG. 1 is an elevation view, partially in cross-section of an improved horseshoe in accordance with the present invention.

Referring now to the drawings, wherein like numerals indicate like elements, there is shown in FIG. 1 a preferred embodiment of an improved horseshoe 10 utilizing reinforced belting material in accordance with the present invention. Horseshoe 10 is mounted on a horse's hoof 12. Horseshoe 10 is comprised of padding formed from reinforced belting material 14 and a truncated metal horseshoe 16.

Figure 3:
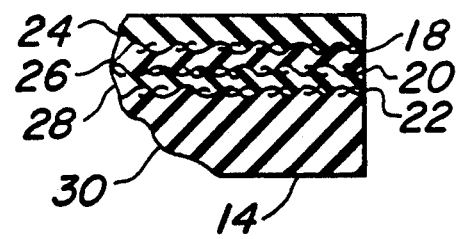
FIG. 3 is a broken away cross-sectional view of a portion of the padding of FIG. 1.

The reinforced belting material 14 is shown in greater detail in the exploded cross-sectional view in FIG. 3. In the preferred embodiment shown in FIG. 3, there are three layers of reinforcing material 18, 20 and 22 between layers of rubber 24, 26, 28 and 30. The reinforced belting material 14 is comprised of at least one layer of reinforcing material, and as illustrated in FIG. 3 preferably has multiple layers. The reinforcing material may be any suitable type of reinforcing material as is commonly utilized in belting material. This may be a fabric type material often of nylon. However, any suitable reinforcing material may be utilized.

In a preferred method of practicing the present invention, for all of the belting material used in connection with the various embodiments of the present invention as described herein, preferred readily available economical sources of the belting material are used belting material and/or belting material with minor defects which is commonly referred to as "seconds". However, it is understood that new commercial grade belting may be utilized in practicing the present invention. However, horses are commonly shod two or more times a year, and an economical source for such belting material is the used or seconds belting which provides a satisfactory grade of padding for this purpose.

The reinforcing material in the belting is important in providing the lateral stability for a padding of the thickness contemplated in the practicing of the present invention which may preferably be in the range of approximately one-quarter of an inch to an inch. In the presently preferred embodiment, the belting is typically approximately three-quarters of an inch thick. The reinforcing material may be any suitable reinforcing material commonly utilized in conveyor belts and the like. This may preferably be a fabric made of material such as nylon, or it may be a steel mesh.

Figure 2:
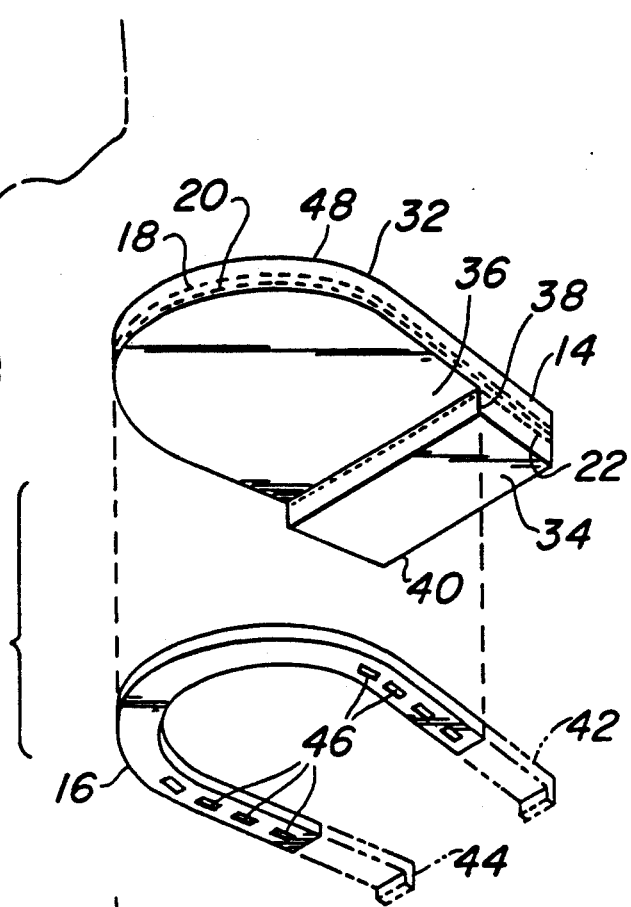
FIG. 2 is an exploded perspective view of the horseshoe of FIG. 1.

Referring now particularly to FIGS. 1 and 2, it is seen that horseshoe 10 is comprised of a belting material 14 having a hoof side 32 and a turf side 34. The reinforced belting material 14 has layers of reinforcing material 18, 20 and 22 as described with respect to FIG. 3. As may be best seen from FIG. 2, a toe portion of the turf side of the belting material is removed at 36 by a vertical cut at 38 and a separation along reinforcing layer 22. The heel portion of rubber layer 30 remains.

A truncated metal horseshoe 16 is adhesively mounted onto the belting material 14 on the turf side of the belting material where the toe portion of rubber layer 30 has been removed. As may be best seen in FIG. 2, as shown in phantom, heel portions 42 and 44 have been removed to form the truncated horseshoe 16. Horseshoe 16 may be comprised of any suitable horseshoe material, and is preferably a metal such as iron or steel which is commonly utilized in the shodding of horses.

Truncated horseshoe 16 is adhesively bonded to the reinforced belting material 14 by a high strength epoxy adhesive. A presently preferred adhesive is a commercially available adhesive under the trademark 2-TON EPOXY from the Devcon Corporation, Wooddale, Ill. 60191.

The horseshoe 10 is then applied to the horse's hoof 12 in the conventional manner by nailing the horseshoe 10 through nailing holes 46 of truncated metal horseshoe 16, through toe portion 48 of pad 14 and into hoof 12. In a presently preferred embodiment, the thickness of the pad in the toe portion 48 has been approximately one-quarter to five-sixteenths of an inch and in the heel portion 40 of approximately three-quarters to thirteen-sixteenths of an inch. However, it is understood that other pad thicknesses may be utilized in practicing the present invention.

Figure 12:
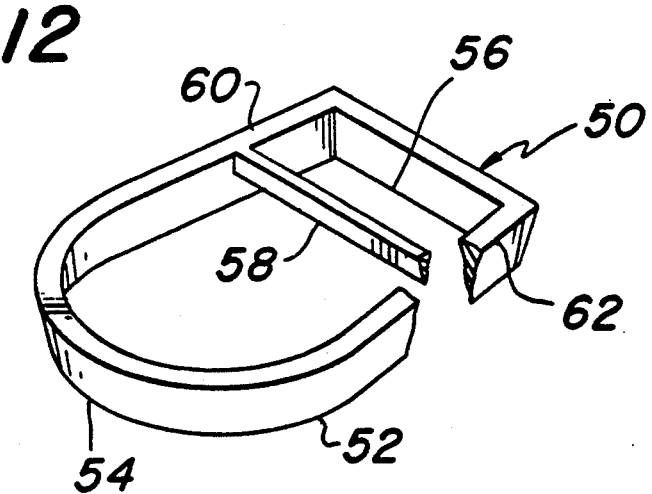
FIG. 12 is a view in perspective, partially broken away, of a die usable with a press or manually for cutting the reinforced padding for the embodiment of FIG. 1.

There is shown in FIGS. 8, 10 and 12 dies for producing the belting material padding utilized in the embodiment of FIG. 1 of the present invention. FIGS. 8 and 10 further show a press which may be utilized in connection with a suitable die and FIG. 9 shows an exploded cross-sectional view of a portion of the belting material being die cut in FIG. 8. Referring now first to FIG. 12, there is shown a die 50 which may be utilized by a press or manually, that is utilizing a hammer or mallet to die cut the belting material to be utilized is the embodiment of FIG. 1. As may be seen from FIG. 12, die 50 is provided with a cutting edge 52 in the shape of a horse hoof. In other words, peripheral cutting edge 52 is in the shape of a horse's hoof and includes a toe area 54 and a heel area 56. Die 50 is further provided with a cutting edge 58 which is recessed from the peripheral cutting edge 52 and extends from one side 60 to another side 62 of the die at a location intermediate the toe area 54 and the heel area 56.

Another embodiment of a die for cutting the belting material for use in the embodiment illustrated in FIG. 1 is shown in FIGS. 8 and 10 at 64. Die 64 is mounted to a press 66 having a piston 68 connected to die 64. The die 64 is similar to that described with respect to FIG. 12, and includes a heel cutting edge 76, a toe cutting edge 54, both of which are part of a peripheral cutting edge similar to 52 shown in FIG. 12. Die 64 is also provided with a recessed cutting edge extending from one side to the other at a location intermediate the toe area cutting edge 74 and the heel area cutting edge 76.

Die 64 has a closed upper surface 70 to aid in attachment to piston 68 and openings or recesses 72 and 82 to enable pins 80 and 84 to enter the die when the piston is retracted to force out the reinforced belting material 114.

As may be best seen in FIG. 9, the reinforced belting material which is being die cut in FIGS. 8 and 9 is provided with four layers of reinforcing material and six layers of rubber 120 through 125. As may be seen in FIGS. 8 and 10, recessed cutting edge 78 cuts through rubber layers 120 and 121 and separation of the toe portion 86 of the turf side of the pad 114 is made along the layer of reinforcing material 116.

Figure 13:
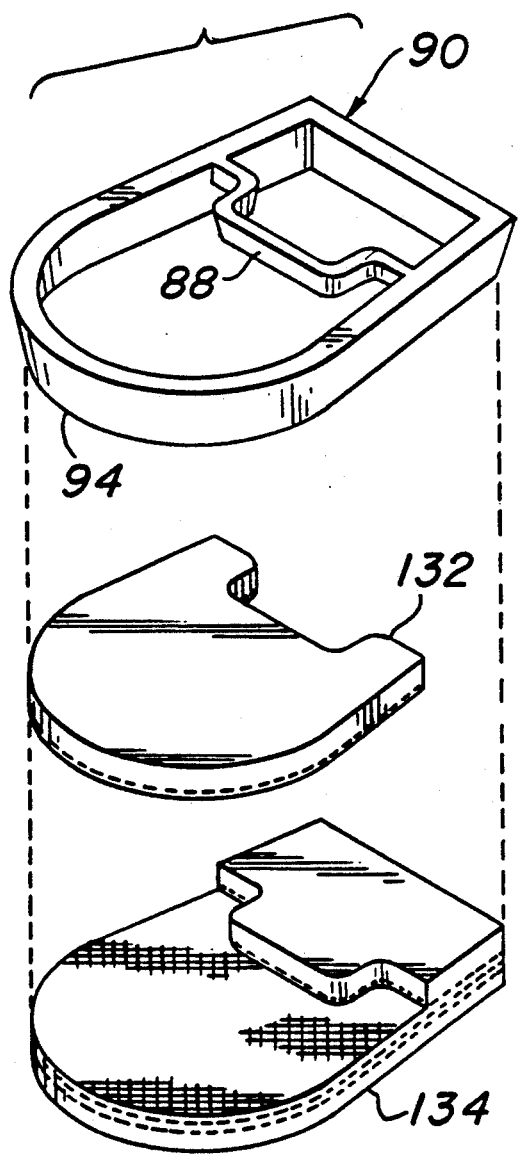
FIGS. 13 and 14 are views in perspective of two other dies similar to that shown in FIG. 12 with variations in the shape of the recessed cutting edge and illustrating corresponding variations in the shape of the pads which are cut and separated.
Figure 14:
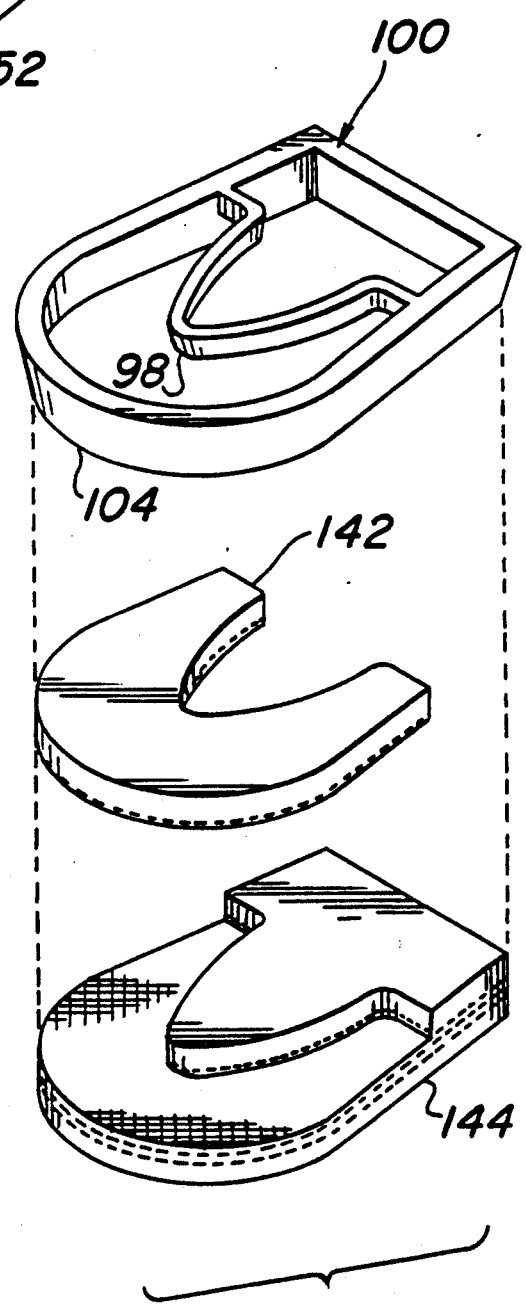

Referring to FIGS. 13 and 14, there is shown variations of dies 50 and 64 wherein the recessed cutting edge which extends from one side to the other of the periphery of the die at a location intermediate the toe and heel cutting edges is provided with a variation in shape. In both the embodiments shown in FIGS. 13 and 14, the recessed cutting edge 88 in FIG. 13 and 98 in FIG. 14 extends forward centrally. In other words, recessed cutting edge 88 extends toward the toe area 94 of die 90 in the central portion of recessed cutting edge 88. Similarly, the central portion of recessed cutting edge 98 extends toward the toe area 104 of die 100. The dies of FIGS. 13 and 14 produce padding which corresponds to the shapes of the cutting edges. For example, with respect to FIG. 13, die 90 with recessed cutting area 88 produces pad 134 as shown. As may be seen in FIG. 13, the removed portion is 132 which is removed along one of the layers of reinforcing material. In a similar manner with respect to FIG. 14, a pad 144 is produced, which corresponds to the shape of the cutting edges of die 100, and particularly the variation in the recessed cutting edge 98. Die 100 produces a removed portion 142 which is removed along one of the layers of reinforcing material.

Figure 4:
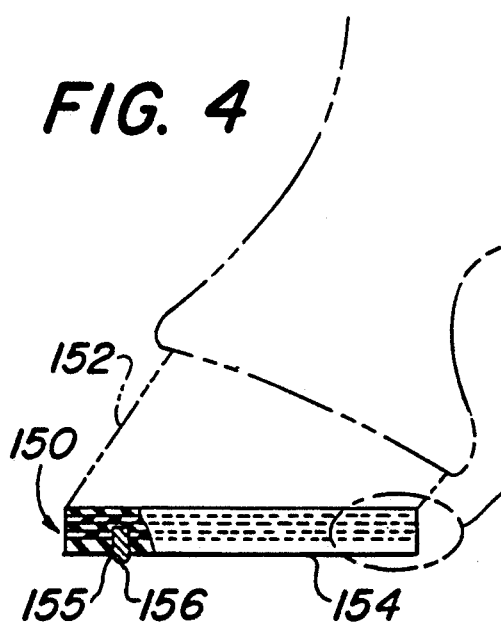
FIG. 4 is an elevation view, partially in cross-section, of another embodiment of an improved horseshoe in accordance with the present invention utilizing rubber belting and a toe calk.
Figure 6:
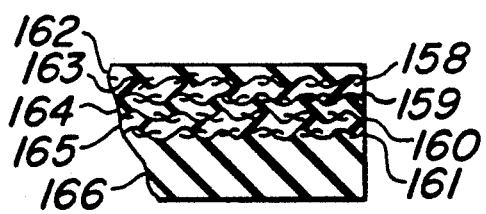
FIG. 6 is a broken away cross-sectional view of a portion of the belting of FIG. 4.
Figure 5:
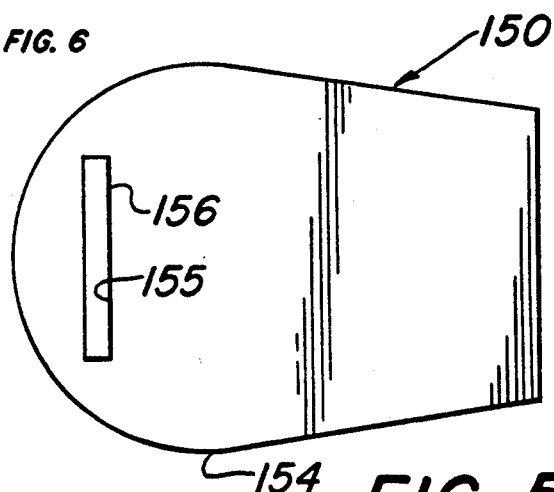
FIG. 5 is a plan view of the horseshoe of FIG. 4.

Another embodiment of the present invention is illustrated in FIGS. 4, 5 and 6 wherein there is shown a padded horseshoe 150 having a pad comprised of belting material 154 and a metal toe calk which may be made of iron, steel or other suitable sufficiently hard material. Toe calk 156 is adhesively mounted in a recess in the turf side of the toe portion of pad 154. Horseshoe 150 is mounted to hoof 152 by the conventional manner of nailing. Pad 154 is comprised of reinforced belting material as shown in cross-section at FIG. 4 and in exploded cross-section in FIG. 6. As best seen in FIG. 6, four layers of reinforcing material 158 through 161 are utilized between five layers of rubber 162 through 166. The structure of the reinforced padding and the layers of reinforcing material may be as described above with respect to the other embodiments. Toe calk 156 may be adhesively bonded within recess 155 by the use of the 2-TON EPOXY ™ adhesive described above.

Referring now to FIG. 7, there is shown another embodiment of the present invention comprising a horseshoe 170 mounted to a hoof 172. Horseshoe 170 is comprised of reinforced belting material 174 and a metal horseshoe 176. Metal horseshoe 176 is provided with an upwardly extending toe cleat 178 which provides additional stability for the arrangement of the metal horseshoe 176 and reinforced belting material 174 with respect to hoof 172. The metal toe cleat extension 178 on metal horseshoe 176 also provides additional protection. Metal horseshoe 176 may be adhesively bonded to the reinforced belting material 174. The structure of the reinforced padding and the layers of reinforcing material may be as described above with respect to the other embodiments.

There is shown in FIG. 11 a die and press which may be utilized for the cutting of the pads utilized in the embodiments of FIGS. 4, 5 and 6 on the one hand or FIG. 7 on the other hand. There is shown in FIG. 11 a die 180 connected to a piston 188 of a press 186. The reinforced belting material 184 is cut as shown. As illustrated in FIG. 11, the reinforced belting material 184 is comprised of five layers of rubber with four layers of reinforcing material, similar to that as described in FIG. 6. It may be noted that the pad 174 of FIG. 7 is illustrated as being comprised of three layers of rubber, having two layers of reinforcing material.

It will be appreciated by those skilled in the art that various numbers of layers of rubber and reinforcing material may be utilized in the practicing of the present invention.

Figure 15:
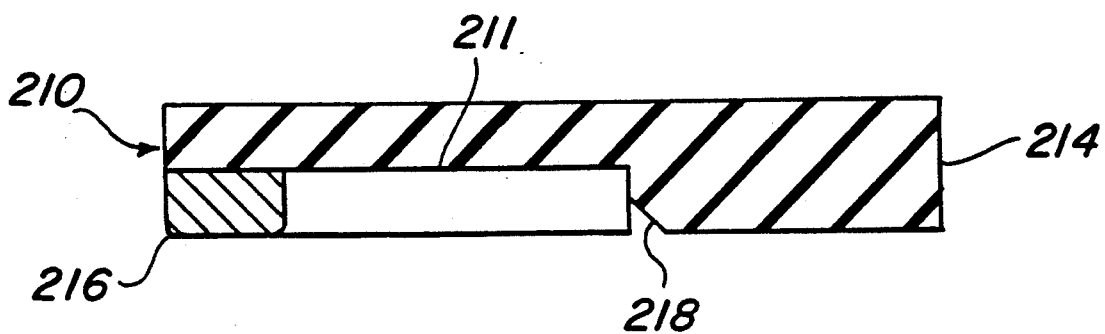
FIGS. 15, 16 and 17 are cross-sectional views of a padded horseshoe similar to that shown in FIG. 1 utilizing solid rubber or a synthetic plastic material for the padding with variations in the shape of the padding.
Figure 16:
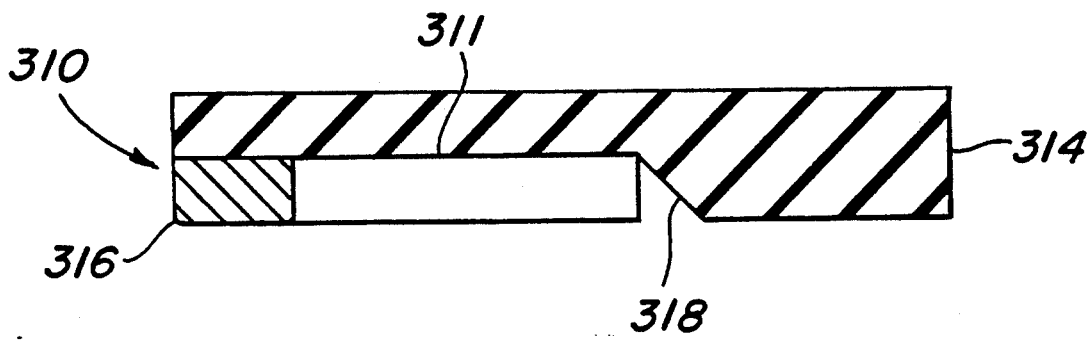
Figure 17:
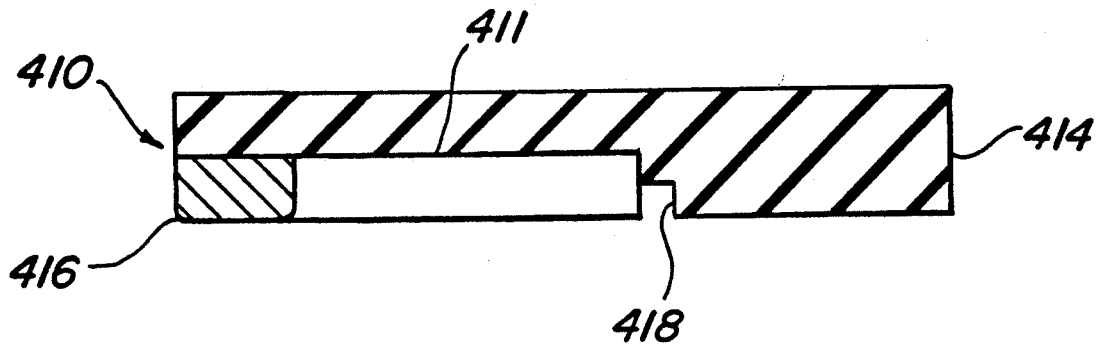

Referring now to FIGS. 15, 16 and 17, there are shown other embodiments of the padded horseshoe of the present invention 210, 310 and 410, respectively. In each of these embodiments, the resilient padding material 214, 314 and 414, respectively, is comprised of a solid rubber, neoprene or various solid synthetic plastic materials which are commercially available, such as polyurethane and others. Each of the padding materials 214, 314 and 414 is preferably formed by a molding process in which the turf side of the toe portion is recessed as shown at 211, 311 and 411, respectively. Each of the padded horseshoes is provided with a truncated metal or hard plastic horseshoe 216, 316 and 416, respectively, similar to that as described with respect to FIGS. 1 and 2. The truncated horseshoes 216, 316 and 416, as well as the truncated horseshoe 16 shown in FIGS. 1 and 2, may be comprised of metal (preferably iron or steel) or commercially available, wear resistant hardened plastics. The truncated horseshoes 216, 316 and 416 may be mounted to their respective pads by an adhesive as described with respect to truncated horseshoe 16. The pad 214 is provided with a partially sloping forward edge 218 which has the effect of reducing the rate at which the pad 214 grabs the turf. The forward sloping edge 318 of pad 314 provides the same effect. Another variation of the reduction of the forward edge is shown at 418 on pad 414, which provides a rectangular notch along the forward edge. Other variations in the leading edge of the pad will be apparent to those skilled in the art.

In view of the above, the present invention may be embodied in other specific forms without departing from the spirit or essential attributes thereof and, accordingly, reference should be made to the appended claims, rather than to the foregoing specification as indicating the scope of the invention.

I claim:

1. A horseshoe comprised of:
    a reinforced belting material having at least one layer of reinforcing material in the plane of the belting material;
    said belting material being comprised of used belting;
    a toe portion of the turf side of said belting material being removed; and
    a truncated metal horseshoe adhesively mounted on said belting material on said turf side of said belting material where said toe portion has been removed.

2. A horseshoe in accordance with claim 1 wherein said at least one layer of reinforcing material in the plane of the belting is a fabric material.

3. A horseshoe in accordance with claim 1 wherein said belting material includes multiple layers of reinforcing material.

4. A horseshoe comprised of:
    a reinforced belting material having at least one layer of reinforcing material in the plane of the belting material;
    said belting material being comprised of seconds belting;
    a toe portion of the turf side of said belting material being removed; and
    a truncated metal horseshoe adhesively mounted on said belting material on said turf side of said belting material where said toe portion has been removed.

5. A horseshoe in accordance with claim 4 wherein said at least one layer of reinforcing material in the plane of the belting is a fabric material.

6. A horseshoe in accordance with claim 4 wherein said belting material includes multiple layers of reinforcing material.

7. A horseshoe comprised of:
    a reinforced belting material having at least one layer of reinforcing material in the plane of the belting material;
    said belting material being comprised of used belting; and
    a toe calk adhesively mounted on the turf side within a recess in the belting material.

8. A horseshoe in accordance with claim 7 wherein said at least one layer of reinforcing material in the plane of the belting is a fabric material.

9. A horseshoe in accordance with claim 7 wherein said belting material includes multiple layers of reinforcing material.

10. A horseshoe comprised of:
a reinforced belting material having at least one layer of reinforcing material in the plane of the belting material;
said belting material being comprised of seconds belting; and
a toe calk adhesively mounted on the turf side within a recess in the belting material.

11. A horseshoe in accordance with claim 10 wherein said at least one layer of reinforcing material in the plane of the belting is a fabric material.

12. A horseshoe in accordance with claim 10 wherein said belting material includes multiple layers of reinforcing material.

13. A horseshoe comprised of:
a reinforced belting material having at least one layer of reinforcing material in the plane of the belting material;
said belting material being comprised of used belting; and
a substantially U-shaped metal horseshoe adhesively mounted to the turf side of said belting material.

14. A horseshoe in accordance with claim 12 wherein said at least one layer of reinforcing material in the plane of the belting is a fabric material.

15. A horseshoe in accordance with claim 12 wherein said belting material includes multiple layers of reinforcing material.

16. A horseshoe comprised of:
a reinforced belting material having at least one layer of reinforcing material in the plane of the belting material;
said belting material being comprised of seconds belting; and
a substantially U-shaped metal horseshoe adhesively mounted to the turf side of said belting material.

17. A horseshoe in accordance with claim 16 wherein said at least one layer of reinforcing material in the plane of the belting is a fabric material.

18. A horseshoe in accordance with claim 16 wherein said belting material includes multiple layers of reinforcing material.

19. A method of shodding horses, comprising the steps of:
obtaining used reinforced rubber belting material having at least one layer of reinforcing material in the plane of the belting material;
forming pads from said used reinforced rubber belting material; and
applying said pads formed from said used reinforced rubber belting to the hoof of a horse to form at least a part of a padded horseshoe.

20. A method of shodding horses, comprising the steps of:
obtaining seconds conveyor belting material having at least one layer of reinforcing material in the plane of the belting material;
forming pads from said seconds conveyor belting material; and
applying said pads formed from said seconds conveyor belting to the hoof of a horse to form at least a part of a padded horseshoe.

* * * * *